(12) United States Patent
De Sousa et al.

(10) Patent No.: US 7,770,398 B2
(45) Date of Patent: Aug. 10, 2010

(54) ANNULAR COMBUSTION CHAMBER OF A TURBOMACHINE

(75) Inventors: Mario Cesar De Sousa, Cesson (FR);
Didier Hippolyte Hernandez, Quiers (FR); Thomas Olivier Marie Noel, Vincennes (FR)

(73) Assignee: Snecma, Paris (FR)

( * ) Notice: Subject to any disclaimer, the term of this patent is extended or adjusted under 35 U.S.C. 154(b) by 635 days.

(21) Appl. No.: 11/672,236

(22) Filed: Feb. 7, 2007

(65) Prior Publication Data
US 2007/0186558 A1 Aug. 16, 2007

(30) Foreign Application Priority Data
Feb. 10, 2006 (FR) .................................. 06 50473

(51) Int. Cl.
*F02C 1/00* (2006.01)
(52) U.S. Cl. .......................................... 60/752; 60/796
(58) Field of Classification Search .................. 60/752, 60/753, 796, 798, 800, 804
See application file for complete search history.

(56) References Cited

U.S. PATENT DOCUMENTS 4,843,825 A * 7/1989 Clark ........................... 60/756
5,609,031 A * 3/1997 Jones ........................... 60/753
6,513,330 B1 2/2003 Rice et al.
6,557,349 B1 * 5/2003 Young et al. ................... 60/752
6,647,729 B2 * 11/2003 Calvez et al. .................. 60/753

FOREIGN PATENT DOCUMENTS

EP 0 724 119 A2 7/1996
FR 2 431 096 2/1980

OTHER PUBLICATIONS

U.S. Appl. No. 11/673,179, filed Feb. 9, 2007, De Sousa, et al.

* cited by examiner

*Primary Examiner*—Michael Cuff
*Assistant Examiner*—Phutthiwat Wongwian
(74) *Attorney, Agent, or Firm*—Oblon, Spivak, McClelland, Maier & Neustadt, L.L.P.

(57) ABSTRACT

An annular combustion chamber of a turbomachine includes an inner wall, an outer wall and a bottom wall arranged between the inner and outer walls in the upstream region of the chamber, in which the bottom wall is divided into several adjacent sectors, each sector being attached to the inner and outer walls, these sectors presenting lateral edges such that the lateral edges of two adjacent sectors overlap. More precisely, each sector can include a lip extending along one of its lateral edges, this lip projecting relative to one of the faces of this sector and covering the lateral edge of the adjacent sector.

9 Claims, 3 Drawing Sheets

ANNULAR COMBUSTION CHAMBER OF A TURBOMACHINE

The invention relates to an annular combustion chamber of a turbomachine, of the type including an inner wall, an outer wall and a chamber bottom arranged between said walls in the upstream region of said chamber. Generally, two attachment flanges arranged downstream of the chamber bottom enable said walls to be attached to other parts of the turbomachine, often inner and outer casings surrounding the combustion chamber.

Formerly, said inner and outer walls of the chamber were made of metal or metal alloy and it was necessary to cool these walls to enable them to withstand the temperatures reached during operation of the turbomachine.

Today, so as to reduce the airflow allocated to the cooling of these walls, they are made of ceramic material rather than metal. Ceramic materials are effectively better at withstanding high temperatures and have a lower bulk density than the metals generally used. The gains made in terms of cooling air and weight result in improved efficiency of the turbomachine. The ceramic materials used are preferably ceramic matrix composites, commonly referred to as CMCs, chosen for their good mechanical properties and their ability to retain these properties at high temperatures.

With regard to the chamber bottom, this part is preferably made of metal or metal alloy, rather than a ceramic material, thereby facilitating the use of known and proven fixing methods, such as welding, enabling other components (generally fuel injection systems and deflectors) to be fixed on the chamber bottom.

The ceramic materials used to make the walls often have a coefficient of expansion around three times lower than that of the metallic materials used to make the chamber bottom, so that the inner and outer walls expand and contract less than the chamber bottom during variations in the operating temperature of the chamber. In other words, the differences in variation between the inside and outside diameters of the chamber bottom and the wall diameters generate stresses in these components during operation of the chamber. These stresses can be the cause of cracking in the walls, the ceramic materials being rather brittle by nature.

To remedy this problem, a solution described in the document FR 2 855 249 consists in providing a plurality of flexible fixing lugs connecting the chamber bottom (made in one annular piece) to said walls, these lugs being capable of deforming elastically as a function of the differential expansion between the components. The principal drawback of a structure of this kind lies in the poor dynamic behavior, when the turbomachine is operating, of the flexible fixing lugs, and it is often necessary to provide damping systems to limit the deformation of these lugs and the vibrations induced. Moreover, spaces remain between the fixing lugs through which fresh air rushes into the combustion chamber, which can degrade the efficiency of the latter while being conducive to the formation of polluting emissions such as, for example, incomplete combustion products and/or carbon monoxide.

The invention aims to overcome these drawbacks, or at least to mitigate them, and proposes as its object a combustion chamber having an alternative structure to the structure with flexible fixing lugs described in FR 2 855 249, that is capable of adapting to the differential expansion between the chamber bottom and the outer and inner walls.

To achieve this aim, the object of the invention is an annular combustion chamber of the type cited hereinbefore, characterized in that said chamber bottom is divided into several adjacent sectors, each sector being attached to said walls.

Thus, the lateral edges of the sectors of the chamber bottom are displaced relative to one another according to variations in the operating temperature of the chamber: when the temperature increases, each sector expands and the lateral edges of the sectors move closer together, whereas when the temperature decreases the lateral edges of the sectors move apart from one another. In this manner, when the temperature varies, the inside and outside diameters of the chamber bottom vary less than if the chamber bottom were made in one annular piece, which generates fewer stresses between the bottom and the walls of the chamber.

At the maximum operating temperature of the chamber, the lateral edges of the sectors are as close as possible to one another. Advantageously, they are in contact thereby significantly limiting, or preventing, the passage of fresh air therebetween, from the outside to the inside of the chamber.

Advantageously, the sectors present lateral edges such that the lateral edges of two adjacent sectors overlap. This makes it possible to obtain good leaktightness between sectors. When the sectors move apart (or closer together), said lateral edges slide one over the other and the leaktightness between sectors is maintained. According to one embodiment, each sector includes a lip extending along one of its lateral edges, this lip projecting relative to one of the faces (upstream or downstream) of this sector and covering the lateral edge of the adjacent sector.

As explained above, the invention is particularly effective when the chamber bottom is made of metal or metal alloy while the inner and outer walls are made of ceramic materials and, in particular, CMC. However, the invention can be applied in other cases, for example with a chamber bottom and walls made of metallic materials, or with a chamber bottom and walls made of ceramic materials. In these latter examples, where the problems associated with differential expansion between the walls and the chamber bottom are less important, or non-existent, the fact that the chamber bottom is sectorised is beneficial for the assembly of the bottom to the walls. In particular, as the sectors are more flexible than a monobloc annular chamber bottom, fewer stresses are created between these parts during their assembly. This assembly is accomplished, for example, by bolting. The risk of these components breaking at their points of attachment is thus reduced.

The invention and its advantages will be better appreciated by reading the following detailed description of an example of a combustion chamber according to the invention, presented for illustrative purposes and non limitative of the invention. This description refers to the appended drawings in which.

The invention is intended for use in any type of turbomachine: turbojet, turboprop, terrestrial gas turbine, etc. The following example relates more particularly to an aircraft turbojet engine.

Figure 1:
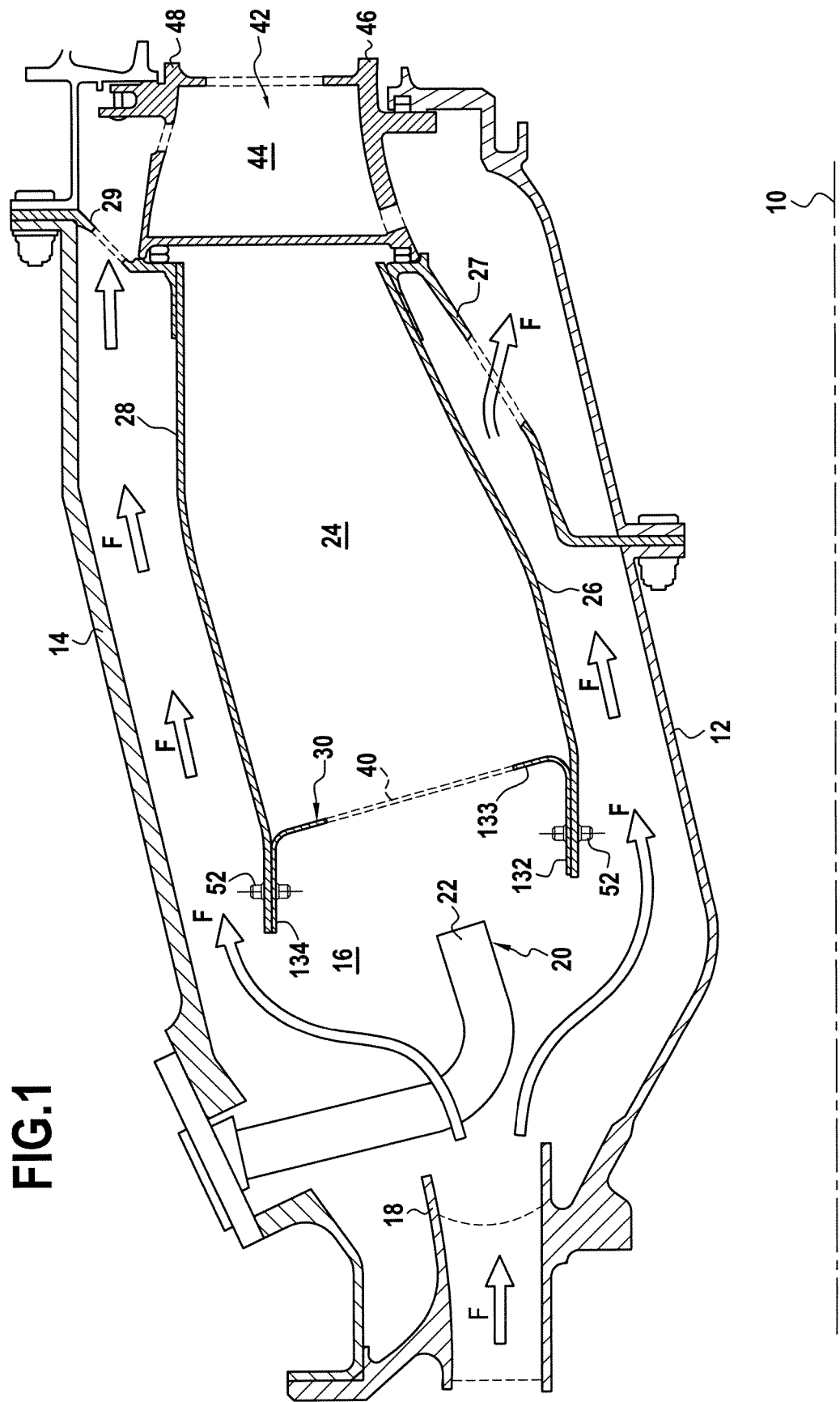
FIG. 1 is a schematic view, in axial half cross-section, of part of a turbomachine equipped with a combustion chamber according to the invention.

FIG. 1 shows part of a turbojet engine, in axial half cross-section, including:

- a circular inner enclosure or inner casing 12, of principal axis 10 corresponding to the axis of rotation of the turbojet engine;

a circular outer enclosure or outer casing 14, coaxial with the inner casing 12;

an annular space 16 between the two casings 12 and 14 receiving the compressed oxidiser, generally air, originating upstream from a compressor (not shown) of the turbojet engine, through an annular diffusion conduit 18.

Figure 3:
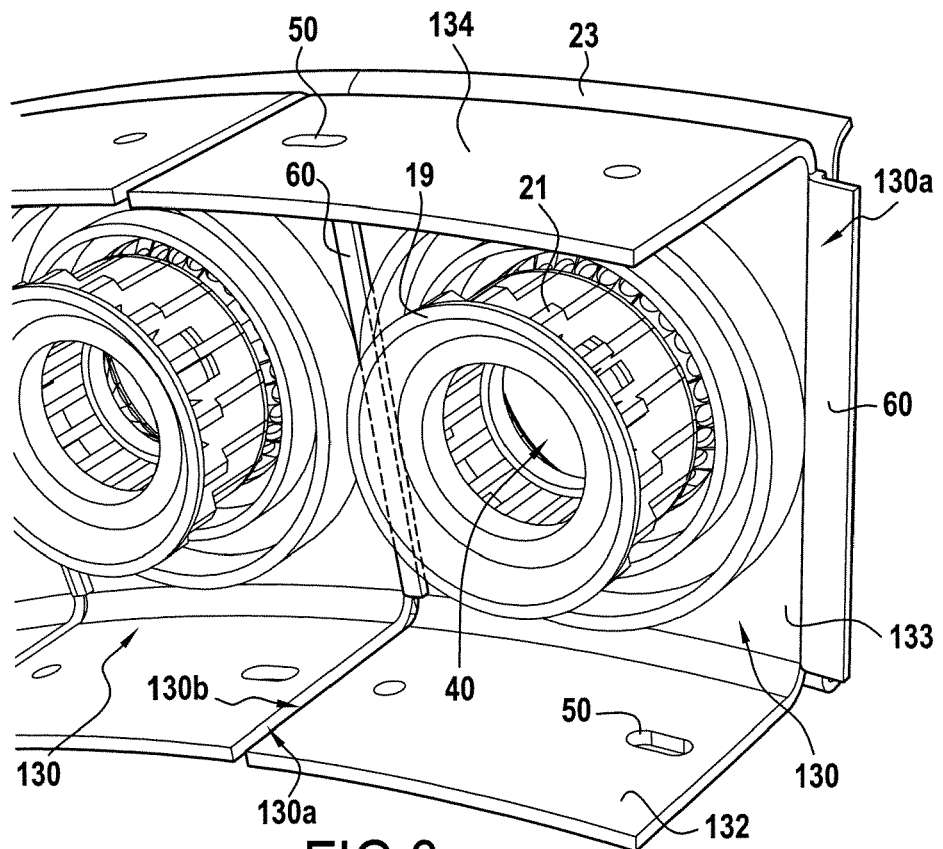
FIG. 3 is a perspective detail view of two sectors of the chamber bottom in FIG. 2, seen from upstream.
Figure 4:
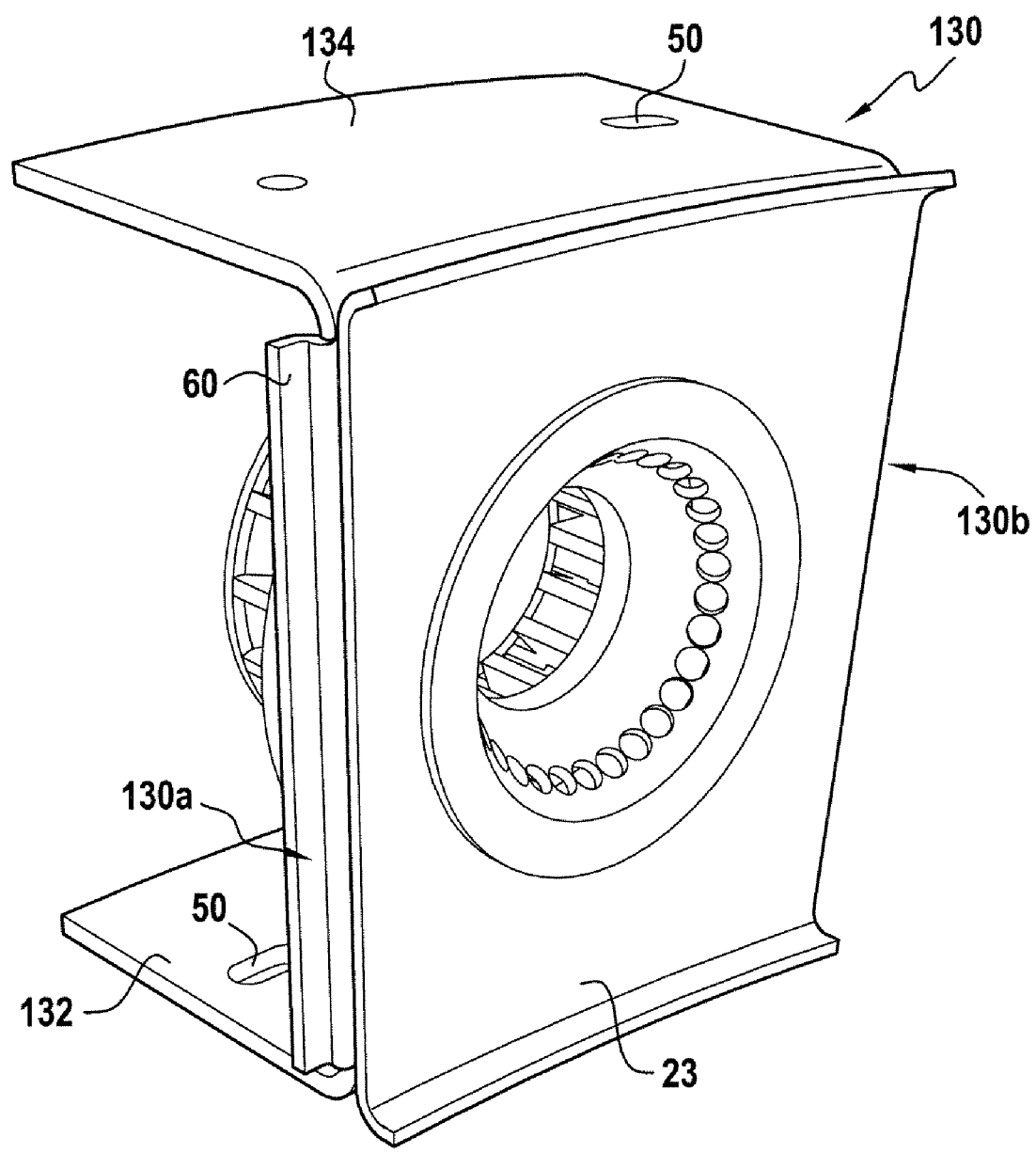
FIG. 4 is a perspective detail view of one sector of the chamber bottom in FIG. 2, seen from downstream.

From upstream to downstream, upstream and downstream being defined in relation to the normal direction of flow of the gases inside the turbojet engine as indicated by the arrows F, the space 16 includes:

an injection assembly to inject fuel into the combustion chamber 24 described below, this injection assembly being formed by a plurality of injection systems 20 evenly distributed upstream of the chamber 24 and each including a fuel injection nozzle 22 fixed on the outer casing 14. The injection nozzle 22 is connected to the chamber 24 via a retaining system 19 and a mixer 21. For the sake of simplicity, these latter components are not shown in FIG. 1, but they do appear in FIGS. 2 to 4;

a combustion chamber 24 including a radially inner circular wall 26 and a radially outer circular wall 28, both coaxial of axis 10, and a transverse wall which constitutes the bottom 30 of the chamber and which is attached to the upstream ends of the walls 26, 28. The chamber bottom 30 is provided with through orifices 40 to facilitate the injection of fuel, via the nozzles 22, and a part of the oxidiser, via the mixer 21, into the combustion chamber;

inner 27 and outer 29 attachment flanges, respectively connecting the inner 26 and outer 28 walls to the inner 12 and outer 14 casings; and an annular distributor 42 made of metal alloy forming a high pressure turbine inlet stage (not shown) and conventionally including a plurality of fixed blades 44 mounted between an inner circular platform 46 and an outer circular platform 48. The distributor 42 being secured to the casings 12 and 14 of the turbomachine by suitable fixing means.

The chamber bottom 30 is made of metal alloy, while the walls 26 and 28 of the chamber 24 are made of ceramic matrix composite material, or CMC.

The chamber bottom 30 is divided into several adjacent sectors 130. Each sector 130 has a central part 133, oriented substantially perpendicular to the axis 10, and wherein is formed at least one through orifice 40. This central part 133 extends at its bottom and top via two returns 132, 134, oriented substantially on axis 10, and attached respectively to the inner 26 and outer 28 walls.

Figure 2:
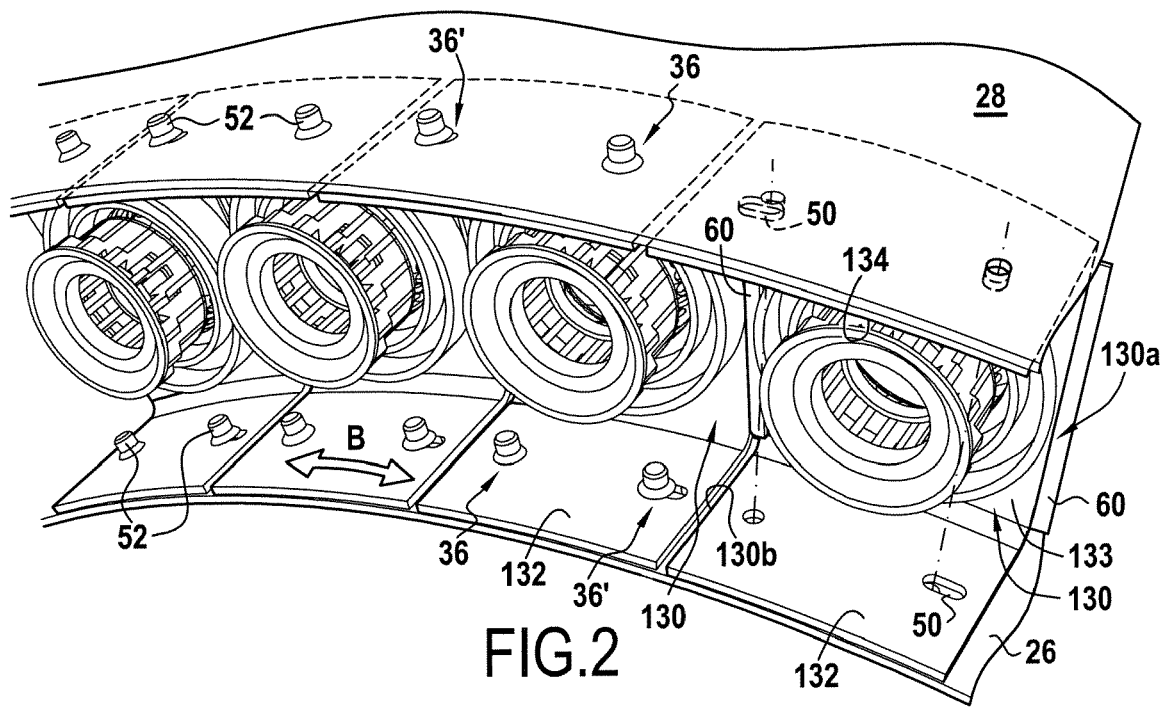
FIG. 2 is a partial perspective view, seen from upstream, of the bottom of the combustion chamber in FIG. 1.

In reference to FIG. 2, the particular manner in which the lateral edges 130a, 130b of two adjacent sectors 130 overlap will now be described. Each sector 130 includes a lip 60 extending along one of its lateral edges 130a, preferably, substantially over the full length of the central part 133 thereof. The other lateral edge of the sector is devoid of a lip and will be referred to hereinbelow as the plain edge 130b.

The lip 60 projects relative to the central part of the sector 130, upstream or downstream, so as to be able to cover the plain edge 130b of the adjacent sector. In the example depicted in FIG. 4, the lip 60 projects on the side of the upstream face of the sector 130 which makes it possible, if necessary, to mount a baffle 23 on the downstream face thereof.

The lip 60 can be formed directly during the manufacture of the sector 130, or at a machining stage after its manufacture. The lip 60 can also consist of a strip fitted, for example by welding (brazing), onto the lateral edge 130a of the sector.

When the sectors 130 move apart relative to one another, following a decrease in the operating temperature of the chamber 24, the lateral edge 130a and the lip 60 of a sector move away from the plain lateral edge 130b of the adjacent sector. The lip 60 is made sufficiently wide so that, when the sectors 130 move apart, the formation of an unduly large circumferential play between the sectors is avoided. When the lip 60 is sufficiently wide that the circumferential play between the sectors 130 is zero or negative, the passage of fresh air between the sectors 130 is prevented (or at least significantly restricted).

Again in order to limit the passage of fresh air between the sectors, provision is made so that the downstream (or upstream) face of the lip 60 is in contact with the upstream (or downstream) face of the adjacent plain lateral edge 130b. However, if the friction accompanying this contact is excessive and impairs the relative displacement of the sectors 130, a slight amount of axial play may be left between these faces, to the detriment of the leaktightness between the sectors 130.

According to another aspect of the invention, each sector of the wall 130 is attached to at least one of the walls 26, 28 at two points of attachment 36, 36', so as to ensure secure fixing. This also makes it possible to prevent the sector 130 from pivoting relative to this wall, around one of its points of attachment 36, 36'. In the example, each sector 130 is attached to each of the walls 26, 28, at two points of attachment 36 and 36'.

Advantageously, to attach the sector 130 to the walls 26, 28, a system of attachment is used which allows said two points of attachment 36 and 36' to be brought closer together or moved apart (depending on the circumferential direction of the chamber bottom). In this manner, the creation of stresses in the wall concerned is avoided when the points of attachment 36 and 36' move apart (or move closer together) by virtue of the expansion (or contraction) of the sector 130.

Such a system of attachment corresponds, for example, to a bolt 52 cooperating with at least one oblong hole 50 the width of which corresponds substantially to the diameter of the shank of the bolt 52. This oblong hole 50 can be formed in a return 132 (134) of the sector of the chamber bottom 130, in a wall 26 (28) or in these two parts at the same time. In the example, it was chosen to form an oblong hole 50 only in the returns 132, 134. The holes made in the walls 26, 29, are all cylindrical, having a diameter corresponding to that of the shank of the bolts 52 used.

Each oblong hole 50 is oriented circumferentially (i.e. the length of each hole is oriented on the circumference of the annular chamber bottom 30) and the bolt 52 cooperating with this hole 50, can therefore be displaced circumferentially inside the hole 50 as indicated by the double arrow B. In the example depicted in the Figures, all of the points of attachment 36, 36' are made by bolting but only one fixing point 36' in two is made by bolting through an oblong hole 50. To simplify the Figures, not all of the bolts 52 are shown.

Given that the sectors 130 of the chamber bottom 30 are made of a metallic material, generally a refractory metal alloy, it is easy to fix thereon, for example by welding (brazing), the various components of a fuel injection system 20, such as a retaining system 19 and a mixer 21. Furthermore, if necessary, it is also possible to mount a baffle 23 on the downstream wall of each sector 130, designed to protect the sector 130 against the high temperature gases in the combustion chamber. Such a baffle 23 is optional and its presence depends mainly on the inherent resistance to high temperatures of the material used to make the segments 130.

The invention claimed is:

1. An annular combustion chamber of a turbomachine, including a radially inner wall, a radially outer wall and a bottom wall arranged between said inner and outer walls in the upstream region of said chamber, said bottom wall being directly attached to upstream ends of the inner and outer walls, the bottom wall forming an upstream boundary of the combustion chamber, wherein the bottom wall is divided into several sectors, each sector being attached to said inner and outer walls, and said sectors presenting lateral edges such that the lateral edges of two adjacent sectors overlap.

2. Annular combustion chamber according to claim 1, wherein each sector includes a lip extending along one of its lateral edges, said lip projecting relative to one of the faces of said sector and covering the lateral edge of the adjacent sector.

3. Annular combustion chamber according to claim 2, wherein each sector has a central part extended by two returns attached respectively to said inner and outer walls, said lip extending substantially over the full length of the central part.

4. Annular combustion chamber according to claim 1, wherein each sector is attached to at least one of the inner and outer walls at two points of attachment.

5. Annular combustion chamber according to claim 4, including a system of attachment of said sector to said at least one of the inner and outer walls, which enables said two points of attachment to move closer together or further apart.

6. Annular combustion chamber according to claim 5, wherein said system of attachment corresponds to an attachment by bolting through at least one oblong hole.

7. Annular combustion chamber according to claim 1, wherein the bottom wall is made of metal or metal alloy, whereas the inner and outer walls are made of ceramic material.

8. Annular combustion chamber according to claim 1, wherein each sector of the bottom wall is equipped with a baffle located downstream of said bottom wall.

9. Turbomachine including a combustion chamber according to claim 1.

* * * * *